United States Patent [19]

Padgitt

[11] 3,725,668
[45] Apr. 3, 1973

[54] ROTATIONAL SPEED SENSOR

[75] Inventor: Kenneth W. Padgitt, Arlington Heights, Ill.

[73] Assignee: Borg-Warner Corporation, Chicago, Ill.

[22] Filed: June 28, 1971

[21] Appl. No.: 157,524

[52] U.S. Cl. ............... 250/231 R, 250/233, 250/237
[51] Int. Cl. ............................................. G01d 5/34
[58] Field of Search..... 250/231 R, 231 SE, 232, 233, 250/237; 356/169; 324/160; 73/136

[56] References Cited

UNITED STATES PATENTS

| | | | |
|---|---|---|---|
| 2,579,349 | 12/1951 | Vrooman | 264/12 |
| 3,495,452 | 2/1970 | Johnson | 250/231 |
| 2,995,705 | 8/1961 | Walker | 250/231 SE |
| 2,993,200 | 7/1961 | Walker | 250/231 SE |

*Primary Examiner*—James W. Lawrence
*Assistant Examiner*—D. C. Nelms
*Attorney*—Donald W. Banner et al.

[57] ABSTRACT

A rotational speed sensor for producing a d.c. level output signal proportional to shaft speed is disclosed having a light responsive unit (phototransistor) which is masked from a light source by a pair of slotted discs. One disc defines windows and revolves directly with the shaft and the other defines shades for the windows and is mounted to be rotated by a centrifugal force mechanism mounted to revolve directly with the shaft. By means of a cam surface and groove, the second disc is caused to move relative to the first disc to unshade the window progressively as rotational speed increases. The light responsive unit is preferably of the self-integrating (long time constant) type to time average its output and produce the d.c. signal directly.

3 Claims, 4 Drawing Figures

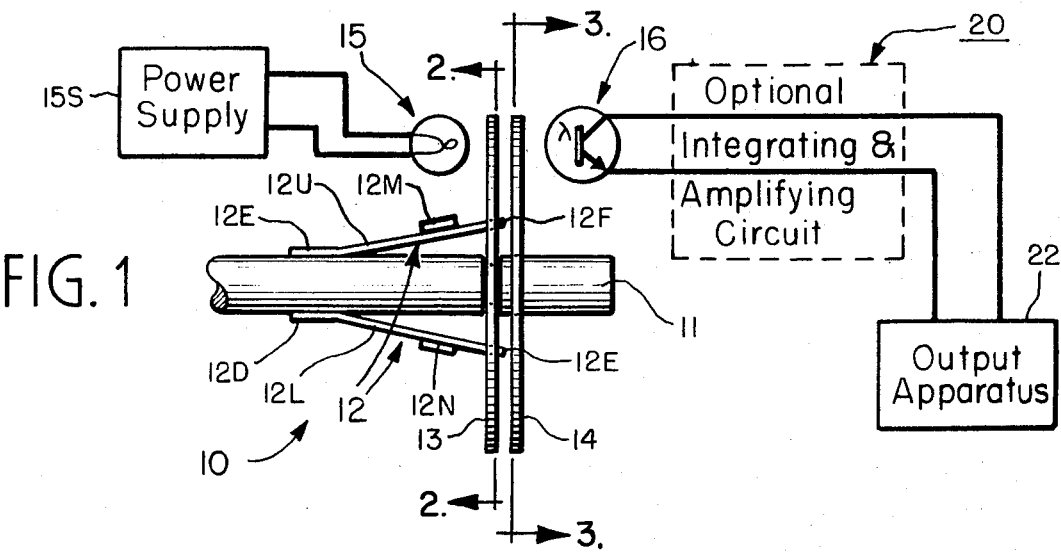
FIG. 1
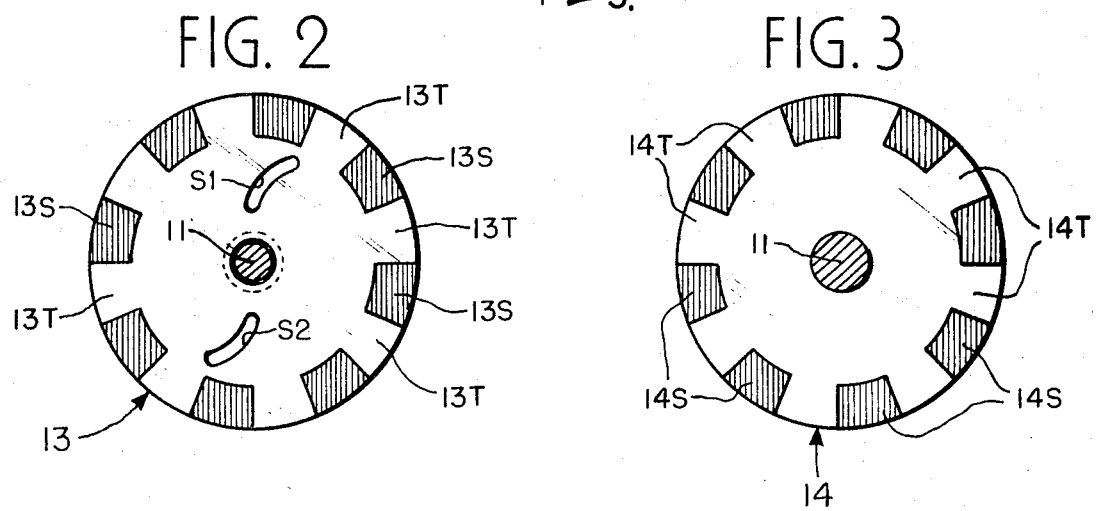
FIG. 2
FIG. 3
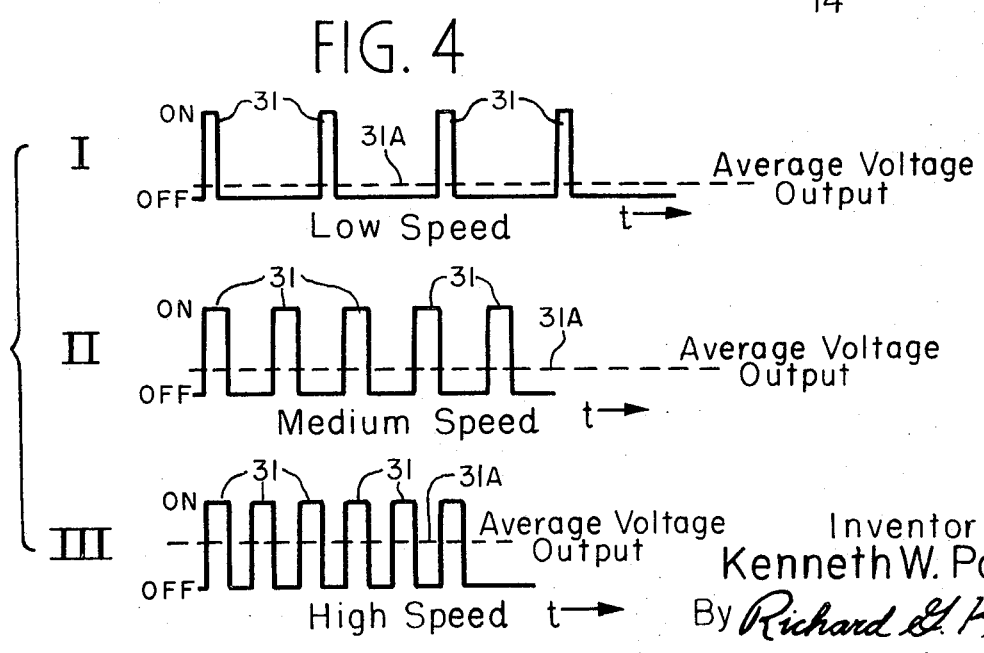
FIG. 4
Inventor
Kenneth W. Padgitt
By Richard G. Kinney
Attorney

3,725,668

ROTATIONAL SPEED SENSOR

FIELD OF THE INVENTION

The present invention relates to rotational speed sensors and is particularly concerned with such a sensor for shaft speed sensing and measuring.

BACKGROUND OF THE INVENTION

Various electronic control systems require an analog signal which varies as a function of some rotational speed. Two methods commonly used are: coupling of an electrical "tachometer generator" to the rotating component by either direct mechanical connection or through belts or gears, and alternatively generating a train of pulses whose frequency is proportional to speed and then converting this frequency modulation to a d.c. voltage or current by means of appropriate electronic circuitry.

The invention disclosed herein eliminates the mechanical complexity of the first method and the electronic complexity of the second.

The present invention provides a simple and economic rotational speed sensor for sensing and for producing an electrical analog signal thereof, rotational shaft speed over a desired range, e.g., from 100 rpm to 5,000 rpm.

SUMMARY OF THE INVENTION

A rotational shaft speed sensor constructed in accordance with the present invention comprises a light source and a light responsive unit, (such as a photocell or light sensitive diode) and means for masking the light responsive unit in response to the centrifugal acceleration of the shaft, whereby the quantity of light reaching the light responsive unit and its electrical output is a function of the rotational shaft speed.

BRIEF DESCRIPTION OF THE DRAWINGS

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements, and in which:

FIG. 1 is a side elevational view, partly in block and partly in schematic form, of a rotational speed sensor and system constructed in accordance with the principle of the present invention;

FIG. 2 is an elevational view of one part, a shade disc, of the sensor of FIG. 1 as seen from the plane 2—2 looking in the direction of the arrows;

FIG. 3 is a similar view of another part, a window disc, of the sensor of FIG. 1 as seen from the plane 3—3 looking in the direction of the arrows; and FIG. 4 is a series of graphical representation of light and signal output versus time for three different rotational speeds, which representations are useful in explaining the operation of the sensor and system of FIGS. 1-3.

DETAILED DESCRIPTION

Referring to FIG. 1, there is depicted a sensor, generally designated 10, which forms part of a speed sensing and indicating system generally designated 20 which is constructed in accordance with the present invention.

The system 20 in addition to the sensor 10, includes output apparatus 22 which may be simply a voltmeter or may be more complex signal utilizing apparatus.

The sensor 10 includes a shaft 11 whose speed is to be sensed. The shaft 11 may be the actual shaft, e.g. the drive shaft of an automobile, whose speed is desired to be sensed, or it may be one geared or otherwise coupled thereto.

In accordance with the present invention, the shaft is provided with a spring-mass system 12 whose outward radial deflection is a function of the centrifugal force and thus of the rotational speed. The system 12 includes an upper and lower leaf spring members 12U and 12L affixed at one end 12E, 12D to the outer surface of the shaft 11 and having an upper and lower mass 12M, 12N respectively affixed thereto near their free ends 12F, 12E.

The sensor 10 also includes a shade masking disc 13 (FIG. 2) journaled freely in the shaft 11 for rotation thereabout, but for the system 12 which serves to drive the disc 13 with the shaft 11. This is done by means of the free ends 12E, 12F of the members 12L, 12D which ends project into slots S1 and S2. The slots S1 and S2 are cam slots which together with the free end of the spring members 12U, 12L define means for shifting the disc 13 relative to the shaft 11. The disc 13, it should be noted, is preferably of a low mass so to react essentially only in response to the system 12. This is in stark contrast to acceleration and de-acceleration measuring systems such as that of e.g., U. S. Pat. No. 2,579,349.

About the rim of the disc 13 are formed a plurality of opaque masking segments or shades 13S with intermediate transparent slot-zones 13T. These may, as depicted, be formed by having the disc transparent with masks 13S or by forming the disc of opaque material and cutting out slots 13T.

The disc 13 is mounted so that the shades 13S and slots 13T orbit between a light source 15, (which is preferably a bulb powered by a supply 15S) and a light responsive unit 16, (preferably a phototransistor) which produces a signal in response to light incident thereon. The unit 16 is preferably of a self-integrating long time constant type device and is coupled to the output apparatus 22, (or alternatively the output apparatus may serve this function). The unit 16 may be a photocell, a light sensitive diode or a light sensitive transistor as shown.

For some types of units 16 and apparatus 22, an integrating circuit and/or amplifying circuit 21 may be needed.

The system 10, includes a second masking disc 14 which is affixed to the shaft 11 to rotate directly therewith between the disc 13 and the unit 16. As is shown in FIG. 3, the second disc 14 includes a similar set of shade zones 14S and transparent zones 14T about its periphery the former serving as windows and the later of shields or shades.

The two discs 13 and 14 are mounted such that, at rest and for very low velocities, shades 13S of the disc 13 essentially cover the windows 14T of the disc 14 to prevent light from the source 15 from reaching the unit 16.

As the shaft 11 picks up speed, the masses 12M, 12N are propelled outward by centrifugal force (which is resisted by the leaf springs 12U, 12L). This movement projects the cam ends 12F, 12E of the members 12U, 12L in the cam slots S1 and S2 of the disc 13 and thus rotates (changes the relative angular position) that disc relative to the shaft 11 and its carried disc 14. This change in the relative angular position of the members 13 and 14 opens a small light slit between the no-longer-aligned shades 13S and windows 14T to allow successive pulses of light to cross the path between the bulb 15 and phototransistor 16. This condition is shown graphically in Graph (I) of FIG. 4 wherein the pulses 31 represent the light incident on the unit 16 and the dashed line 31A represents the average or integrated output to the apparatus 22. It should be noted that the pulses 31 represent an unshading of about 15 percent of the circumference (or approximately 30 percent of the total window opening). Graph (II) of FIG. 4 illustrates of higher speed wherein the means 12 has increased the unshading to about one third (or two-thirds of the maximum opening) and Graph (III) represents the highest speed wherein the windows are fully unshaded.

As a specific example for the system 20 the unit 16, may be a silicon phototransistor, e.g., MRD 300, having its set of transparent and opaque zones 14S and 14T about its collector connected to a bias source of +20 volts and its emitter connected to a 1K ohm resistor (connected to ground or reference potential) with a meter connected across the resistor as the output apparatus 22. The light source need only be a simple bulb, e.g., No. 47, powered from a 6v. power supply and otherwise shielded from the unit 16, save for the discs 13, 14. These latter may be made of plastic or aluminum (cut out slots) with eight windows and eight shades each occupying 22.5° of the circumference.

While only a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. A rotational speed sensor for producing a signal representative of the rotational speed of a shaft mounted for rotation comprising:
   a first mask member coupled to rotate with the shaft at a rotational speed which is a function of the rotational speed of the shaft said first member defining at least one window;
   a second mask member coupled to rotate with the shaft at a rotational speed which is a function of the rotational speed of the shaft, said second member defining means for shading at least said one window of said first member;
   said first member and said second member being mounted to allow movement relative to each other;
   a light source;
   a light responsive unit for producing an electrical signal in response to the quantity of light incident thereon;
   said source and said unit being operatively associated with said masks to produce an electrical signal from said unit that varies as a function of the relative positions of said masks; and
   means for moving said members relative to each other in response to the rotation of said shaft, said means for moving including a mass mounted for rotation with the shaft and a spring for mechanically biasing said mass toward its center of rotation.

2. The invention as defined in claim 1, wherein:
   said first member is affixed to the shaft;
   said second member is mounted on the shaft for movement relative thereto;
   said means for moving moves said second member relative to the shaft and the first member in response to the outward movement of said mass, and includes a cam member as part of the spring and a cam slot defined in said second member in which said cam member may move.

3. A speed sensor for sensing the speed of a rotatable shaft comprising:
   a plurality of members coupled to the shaft so as to rotate with the shaft at a speed which is a function of the shaft rotational speed, said members being mounted so as to allow their angular position relative to each other to change;
   signal producing means coupled to said members for producing an output signal which signal varies as a function of the relative angular position of said members; and
   centrifugal force means including a mass mounted to orbit about an axis at a speed which is a function of the rotation speed of the shaft and to be radially displaced from the axis as a function of said orbit speed,
   said centrifugal force means being coupled to said members to change the relative angular position of said members in response to the radial displacement of said orbiting mass of said centrifugal force means.

* * * * *